US 6,697,627 B1

(12) United States Patent
Ueno

(10) Patent No.: US 6,697,627 B1
(45) Date of Patent: Feb. 24, 2004

(54) BASE STATION SELECTION SYSTEM, APPARATUS AND METHOD FOR A WIRELESS LOCAL AREA NETWORK (LAN)

(75) Inventor: Tsukasa Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 586 days.

(21) Appl. No.: 09/672,022

(22) Filed: Sep. 29, 2000

(30) Foreign Application Priority Data

Sep. 30, 1999 (JP) .......................................... 11/279546

(51) Int. Cl.[7] .................................................. H04Q 7/20
(52) U.S. Cl. ..................... 455/452.1; 455/436; 455/438; 455/440; 455/525; 370/329; 370/331; 370/341
(58) Field of Search ................................. 455/436–440, 455/450–453, 455–456.6, 524–525; 370/329–334, 338, 341, 348

(56) References Cited

U.S. PATENT DOCUMENTS

| 5,499,386 | A | * | 3/1996 | Karlsson ..................... 455/444 |
| 5,737,705 | A | | 4/1998 | Ruppel et al. |
| 5,825,759 | A | | 10/1998 | Liu |
| 5,854,981 | A | * | 12/1998 | Wallstedt et al. ........... 455/439 |
| 6,064,890 | A | * | 5/2000 | Hirose et al. ................ 455/513 |
| 6,295,450 | B1 | * | 9/2001 | Lyer et al. ................... 455/436 |
| 2002/0049039 | A1 | * | 4/2002 | Natarajan .................... 455/62 |

FOREIGN PATENT DOCUMENTS

| EP | 0 877 533 A2 | 11/1998 |
| EP | 1 079 644 A1 | 2/2001 |
| JP | H04-070095 | 3/1992 |
| JP | H07-222245 | 8/1995 |
| JP | 7-307972 | 11/1995 |
| JP | H08-322075 | 12/1996 |
| JP | 9-135473 | 5/1997 |
| JP | H10-094037 | 4/1998 |
| WO | WO 99/01001 A1 | 1/1999 |

* cited by examiner

Primary Examiner—Vivian Chin
Assistant Examiner—Tuan Tran
(74) Attorney, Agent, or Firm—Sughrue Mion, PLLC

(57) ABSTRACT

A wireless local area network (LAN) has a plurality of wireless base stations, one or more wireless mobile terminal machines communicating over specific frequency bands, and a cabled LAN connecting the wireless base stations. The wireless base station comprises a statistics part to summate statistics data such as connection data of individual wireless mobile terminal machines which leave the communication zone of that base station, and obtaining, from the connection data, data arranging base stations in the order of likeliness of their being connected, and to provide the terminal machine with the base station data thus obtained. The wireless mobile terminal machine comprises a frequency selection apparatus whereby the terminal, when it leaves the communication zone of the current wireless base station, refers to the base stations in the order of likeliness of their being connected, and selects appropriate frequencies for voice communication according to the base stations' selection priority.

15 Claims, 5 Drawing Sheets

BASE STATION SELECTION SYSTEM, APPARATUS AND METHOD FOR A WIRELESS LOCAL AREA NETWORK (LAN)

BACKGROUND OF THE INVENTION

1. Field of the Invention

The present invention relates to a base station selection system apparatus and method for a wireless LAN which enables a mobile terminal moving on a wireless LAN to quickly switch connection with one base station to another.

2. Prior Art

Recently, as works in office become automated, LANs are increasingly introduced in companies. With this tendency, the number of connection lines used for a premises LAN of a company is increasing. Conventionally, a LAN constructed in a facility is based on a network composed of cables such as coaxial cables or twisted-pair wires. However, people come to regard this as rather irksome, because introduction of a cabled LAN into an office will cause a so-called "flood of wires," and thus if an office automation machine of that office is moved, or the arrangement of furniture of that office is changed, reconnection of the wires will take a undue labor and time. As a solution to such a problem, the wireless LAN attracts the attention of people, because the wireless LAN, a system based on a wireless network, will relieve the user of troubles involved in the reconnection of wires inherent to a conventional, cabled .LAN.

Introduction of a wireless LAN will bring a number of merits: an office or factory is relieved of the restrictions imposed by wiring; terminals may be chosen more flexibly than is the case with a cabled LAN; and use of portable personal computers or use in a vehicle will become possible.

With such people's expectation towards the wireless LAN as a background, IEEE 802.11 working group started to standardize the operating conditions of the wireless LAN particularly with a view to meet the problems involved in physical layers and MAC or media access control for heavy traffic, and set forth an access mode such as CSMA/CA (carrier sense multiple access with collision avoidance).

However, in contrast with communication between mobile terminals on a public network, communication between mobile terminals on a private wireless network such as one implemented in a company has following problems.

With a public communication network for mobile terminals constructed based on a definite design by communication professionals over a wide area working, for example, on a cellular communication mode, communication zones called cells each with a certain area are arranged around base stations in an urban area in a regular manner and with no interstices between adjacent cells.

The data regarding the location of a mobile terminal is registered, together with the subscriber number of the terminal, through a base station to a location database which serves as a center for management of the location data of individual terminals. If a mobile terminal moves from one communication zone to another, a specific locating means tracks the course of the terminal, and updates the location data of that terminal. The detail of the tracking method will not be touched here. If another terminal sends a call for the moving terminal, connection of the two terminals are achieved based on the subscriber number and current location data of the moving terminal registered in this location database.

In contrast, with a private wireless LAN implemented in a company, it is often difficult to arrange base stations in a regular manner on account of the restrictions imposed by the area and shape of the premise of the company. Moreover, it is often required especially in an office or factory to flexibly modify the arrangement of the network according to current given conditions. Thus, demand for the system to enable easy and quick switching of connections based on the location data of mobile terminals dispersed in a certain area is strong.

In other words, demand for the system enabling the following is strong: even in a wireless LAN where the user often exchanges apparatuses serving as base stations for others, or where the apparatuses are often moved from one place to another, the system has a means to enable a terminal to connect instantly with a base station after removal, or to minimize the procedures necessary for connecting the terminal with a base station apparatus even after that base station has been just removed.

For example, the invention disclosed in Japanese Patent Laid-Open No. 7-307972 titled "Method for allocating radio channels" introduces a method for dynamically allocating voice channels in a digital cordless telephone system based on the voice channel allocation statistics data of communications through the voice channels allocated to mobile stations, and on the data listed in the voice channel allocation table prepared from the measurements of electric field intensity of all the voice channels obtained at regular intervals.

The invention disclosed in Japanese Patent Laid-Open No. 9-135473 introduces a technique for a wireless packet communication system where communication is achieved in a point-to-multipoint manner, whereby it is possible to select an appropriate packet channel from among candidate channels, without resorting to a dedicated receiver. However, this prior art concerns with a technique how to allocate channels when a particular base station communicates with mobile terminals using TDMA mode.

However, the invention disclosed in Japanese Patent Laid-Open No. 7-307972 is provided to allocate radio channels in accordance with current use conditions, and does not give any description as to the method how a new base station should be selected when a mobile terminal enters the communication zone of another base station.

The technique disclosed in Japanese Patent Laid-Open No. 9-135473 does not concern with the method how a new base station should be selected when a mobile terminal enters the communication zone of another base station. Moreover, the means disclosed in those inventions are problematic in that they do not enable a terminal to automatically and efficiently select a frequency appropriate for the base station to be connected next even when base stations have been just removed.

SUMMARY OF THE INVENTION

Selection of a base station according to this invention is achieved with a means which enables a terminal to be instantly connected with a new base station even when the terminal moves about in a premise.

Generally, if a terminal moves from the communication zone of one base station into that of another, the mobile station identifies this newly entered base station and uses a frequency band assigned thereto, thereby establishing communication through the newly entered base station. The principal object of this invention is to provide a method for automatically and efficiently switching from a foregoing base station apparatus to a current base station apparatus when the terminal machine moves in a network, based on the data provided by terminal machines, and a means for managing the data useful for the above purpose.

The object of this invention is achieved by providing a communication system based on a wireless LAN comprising a plurality of wireless base stations, one or plural wireless mobile terminals to communicate with each other using specific frequency bands, and a cabled LAN connecting the plural wireless base stations, wherein:

The wireless base station selecting device of this invention contains a means to summate the statistics data regarding the connection status of individual mobile terminals which move from the communication zones of some base stations to those of other base stations, and a means to transmit base station switching data regarding base stations to be possibly chosen at the next moment arranged in the order of probability of their choice to individual terminal machines, while the wireless mobile terminal contains a frequency selecting means which, the wireless mobile terminal being informed of the base station switching data before it leaves the communication zone of a base station, and arranging the base stations in the order of choice probability based on those previously given data, chooses appropriate frequencies for voice communication in accordance with the base stations arranged as above.

DESCRIPTION OF THE PREFERRED EMBODIMENTS

The preferred embodiments of this invention will be described by means of the attached figures.

Figure 3:
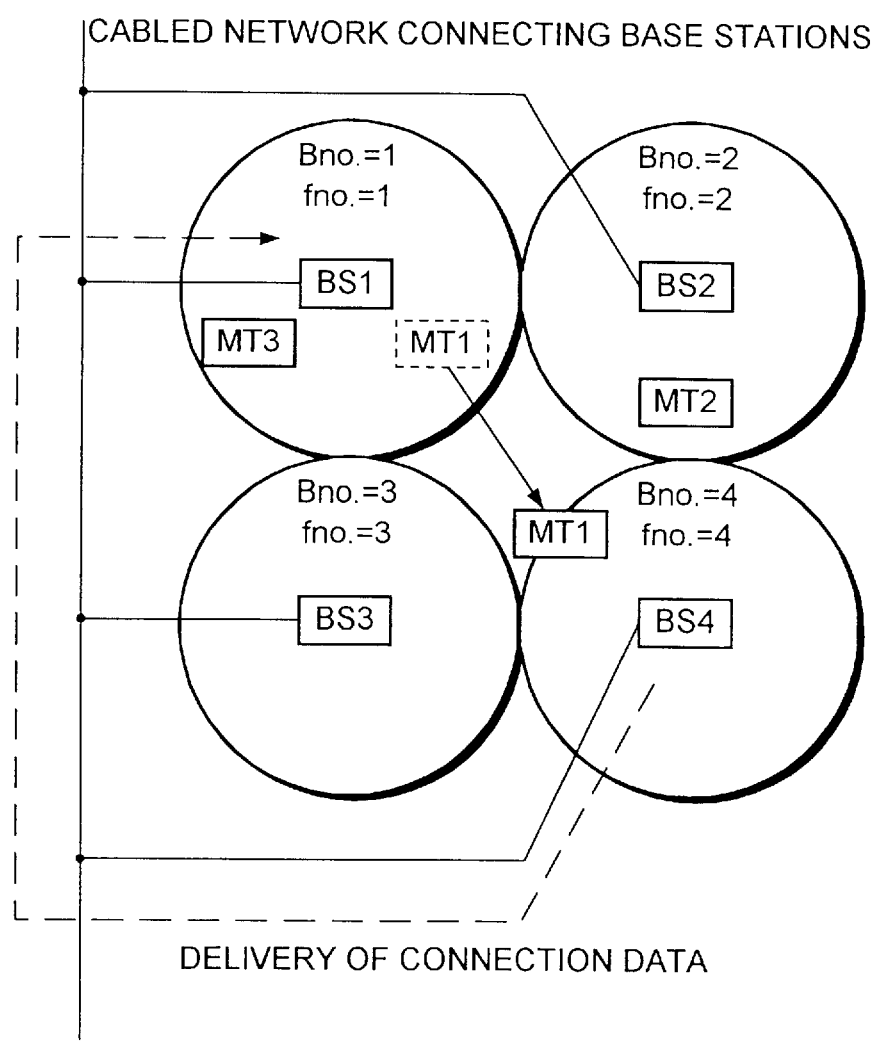
FIG. 3 is a diagram to illustrate the composition of a wireless LAN system representing an embodiment of this invention.

FIG. 3 is a diagram to illustrate the composition of a wireless LAN system representing an embodiment of this invention.

The operation of this embodiment will be given below.

As shown in FIG. 3, base stations BS1, BS2, BS3 and BS4 are assigned respective frequencies fno.=1, 2, 3 and 4, to achieve communication with terminals MT1, MT2 and MT3; and to communicate radio data with a base station, a terminal chooses an appropriate frequency using a use frequency switching circuit 11. Suppose that such a wireless LAN is implemented in the premise of a company. Then, there is often encountered the case where a user who usually uses, as his work place, an office of a building may work at other times in a laboratory at another place or attend a meeting held at a still other place, and use a mobile terminal during move from one place to another. The places frequented by the user have a more or less definite tendency.

If a terminal moves from the communication zone of one base station into that of another, the terminal must quickly choose the frequency of the newly entered base station, in order to restart communication procedures with the latter station. To put it in more concrete terms, communication between a base station and a mobile terminal occurs around 5 GHz, or more particularly takes place at a frequency band of 100 MHz between 5.15 GHz and 5.25 GHz. Thus, this frequency band may be divided into four portions, to serve as carrier frequencies for four channels; each base station may be assigned one of the four frequencies; and the frequency is used for the base station to communicate with a mobile terminal in its communication zone.

If a user communicates on a wireless LAN and moves from the communication zone of one base station into that of another, this invention allows the user to quickly restart communication with the newly entered base station, without requiring him to reset his terminal in order to connect with the newly entered base station.

Figure 1:
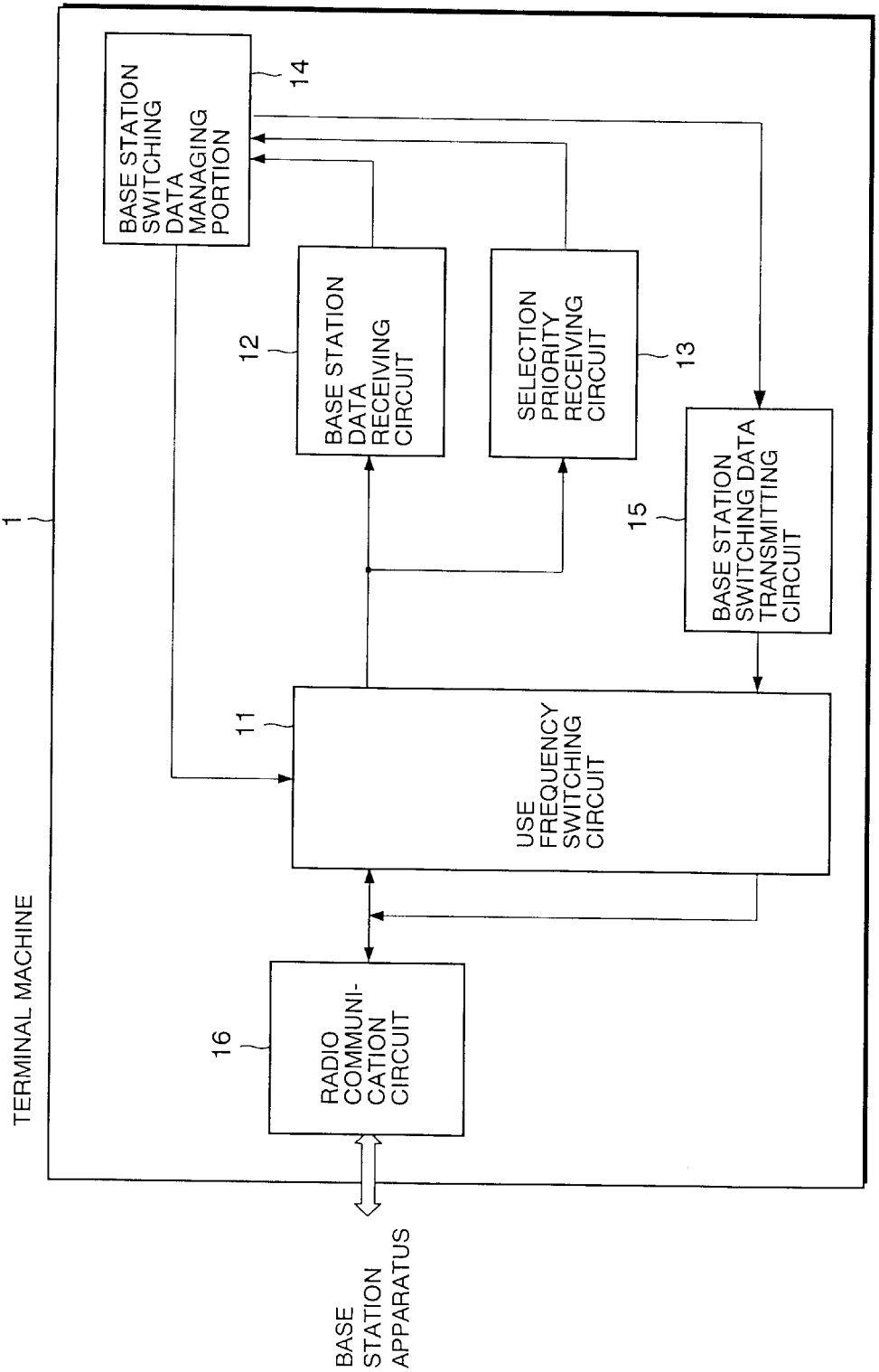
FIG. 1 is a function block diagram of a terminal machine representing an embodiment of this invention.

Next, the composition of the wireless mobile terminal machine and wireless base station will be described in concrete terms. FIG. 1 is a function block diagram of a terminal machine representing an embodiment of this invention, and shows circuit components necessary for the terminal machine representing an embodiment of this invention to choose a base station. The terminal machine representing an embodiment of this invention comprises a use frequency switching circuit 11 to switch frequencies to communicate with different base stations; a base station information receiving circuit 12 to collect switching data transmitted based on the statistics data by a base station; a selection priority receiving circuit 13; a base station switching data managing portion 14; a base station switching data transmitting portion 15 to transmit the connection data to a newly entered base station; and a radio communication circuit 16.

Figure 2:
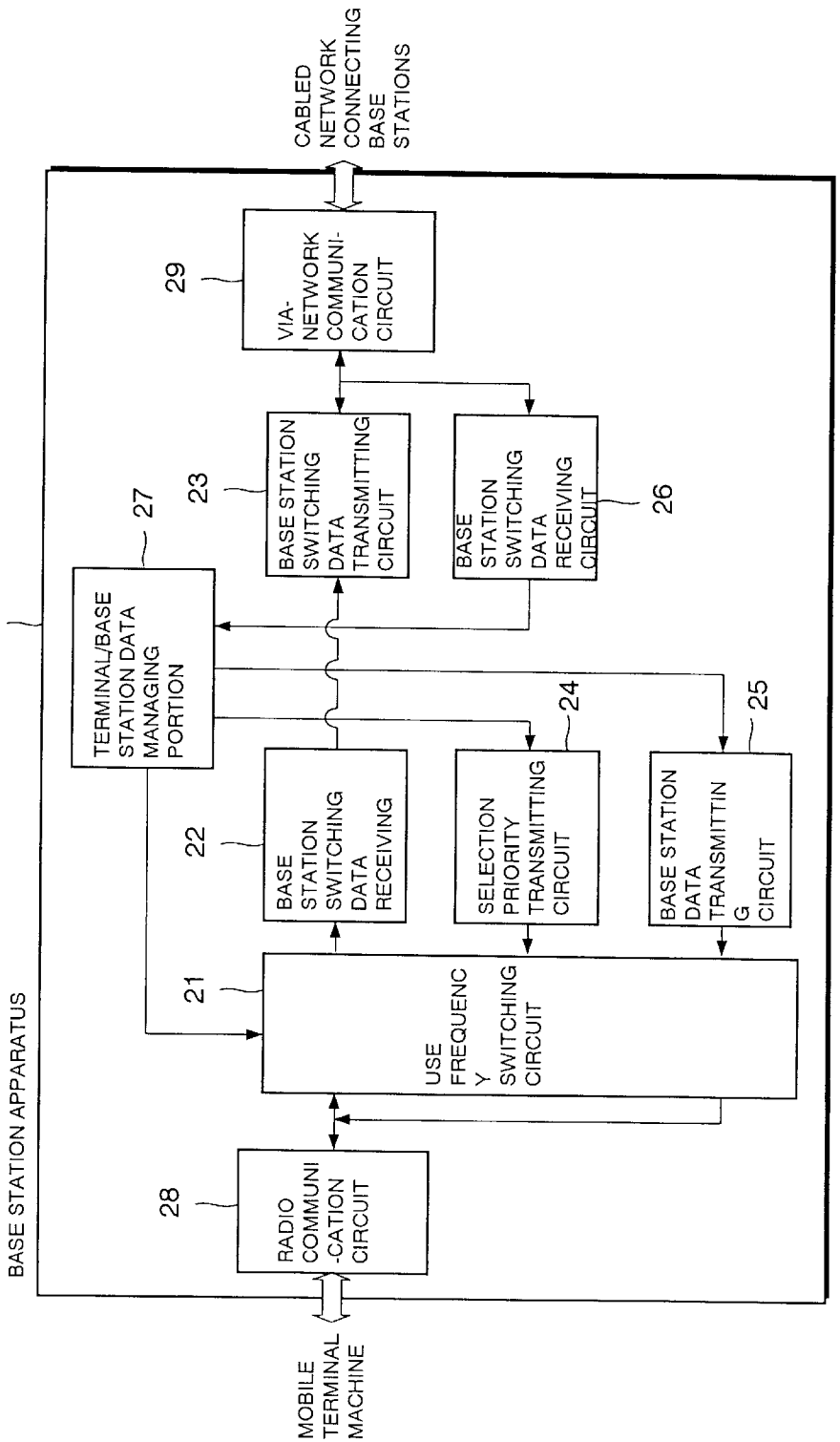
FIG. 2 is a function block diagram of a base station apparatus representing an embodiment of this invention.

FIG. 2 is a function block diagram of a base station apparatus representing an embodiment of this invention, and shows the circuit components of a base station apparatus whereby it is possible for the base station to manage the information of terminal machines, and to transmit the information to other base station apparatuses and to other terminal machines. The base station apparatus comprises a use frequency switching circuit 21 to switch frequencies to achieve communication with terminals; a base station switching data receiving circuit (T) 22 to receive the base station switching data transmitted from mobile terminals; a base station switching data transmitting circuit 23 to transmit the base station switching data of a moving terminal to the base station with which the terminal was previously connected through a cabled network connecting base stations; a selection priority transmitting circuit 24 to transmit switching information obtained from statistics data to a mobile terminal within its communication zone; a base station data transmitting circuit 25; a base station switching data receiving circuit (B) 26 to receive base station switching data from a base station; a terminal/base station information managing portion 27; a radio communication circuit 28; and a via-network communication circuit 29.

A base station communicates with a terminal within its communication zone using a specific frequency, and switching data including information of base stations and their selection priority have been transmitted through a control channel introduced between the base station and the mobile terminal, or as data prepared on a specific information format through an information channel.

On receipt of the data transmitted from the base station, the terminal machine extracts information regarding the base stations and the selection priority of base stations it may pass in a near future using the base station data receiving circuit 12 and selection priority receiving circuit 13, and sends the information to the base station switching data managing portion 14.

The base station switching data managing portion 14 stores the selection priority of candidate base stations, information of the base station currently connected in the form of, e.g., No. and frequency of the base station, information of candidate base stations to be connected at the next moment in the form of, e.g., Nos. and frequencies of those base stations, and manages those data in the form of tables, and updates the data each time it receives the switching data from a base station.

When a terminal machine switches communication with a base station to another, or, to put it in more concrete terms, when a terminal finds it can not receive a control signal from the base station it has communicated with any longer, it starts on its own accord to switch communication to another base station. For this purpose, it tries to connect with base stations one after another in the order of their selection priority depending on the information managed by the base station switching data managing portion 14. More particularly, the mobile terminal, based on the selection priority transmitted in a specific format and stored as such, sends a request for connection by using specific frequencies corresponding to the base stations one after another in the order of priority of the base stations; on receipt of the request for connection, an appropriate base station responds; and connection is established between the mobile terminal and the base station for communication.

Then, the mobile terminal obtains connection data from the base station newly connected. The newly connected base station 2 receives base station switching data from the mobile terminal 1 through the base station switching data transmitting circuit 15 of the latter, extracts therefrom the connection data of the base station newly connected (e.g., No. of base station, Bno.=4, and its frequency, fno.=4), and the connection data of the base station previously connected (e.g., No. of base station, Bno.=1, and its frequency, fno.=1), and transmits the data thus extracted to the wireless base station previously connected via the cabled network connecting the base stations.

Next, the operation of a base station apparatus will be described with reference to the block diagram of FIG. 2.

A base station apparatus communicates with a terminal using a frequency previously notified by the use frequency switching circuit 21. Transmittance/reception of data through the cabled network connecting base stations is achieved by the via-network communication circuit 29. The base station receives, as wirelessly transmitted data, the base station switching data from the terminal via the base station switching data receiver circuit 22, and transmits the data via the base station switching data transmitter circuit 23 to the base station with which the terminal has been connected.

The base station receives data telling, for example, "terminal machine A switches communication from base station 1 with frequency 1 to base station 2 with frequency 2," via the base station data receiver circuit 26, and transmits the data to the terminal/base station information managing portion 27. The data collected as above, or the data indicating, for example, "a terminal under the coverage of base station 1 with frequency 1 moves to enter under the coverage of base station 2 with frequency 2" are summated with time by the terminal/base station information managing portion, and are used to update the information based on which it is determined "what base station will be most likely connected with a terminal under the coverage of the base station here concerned." Then, the base station manages "the information regarding the base stations to be most likely connected with the terminal at the next moment, and their priority order" to send them to the terminal machine in question.

Based on the information gathered at the terminal information/base station information managing portion, the selection priority transmitting circuit 10 transmits selection priority data, e.g., the priority order of base station apparatuses to be most likely connected with the mobile machine. The base station data transmitting circuit 11 transmits base station data, e.g., a table carrying "the Nos. and use frequencies" of the candidate base stations to be most likely connected at the next moment, together with the corresponding data of the current base station.

The operation given above will be further described with reference to FIG. 4.

Figure 4:
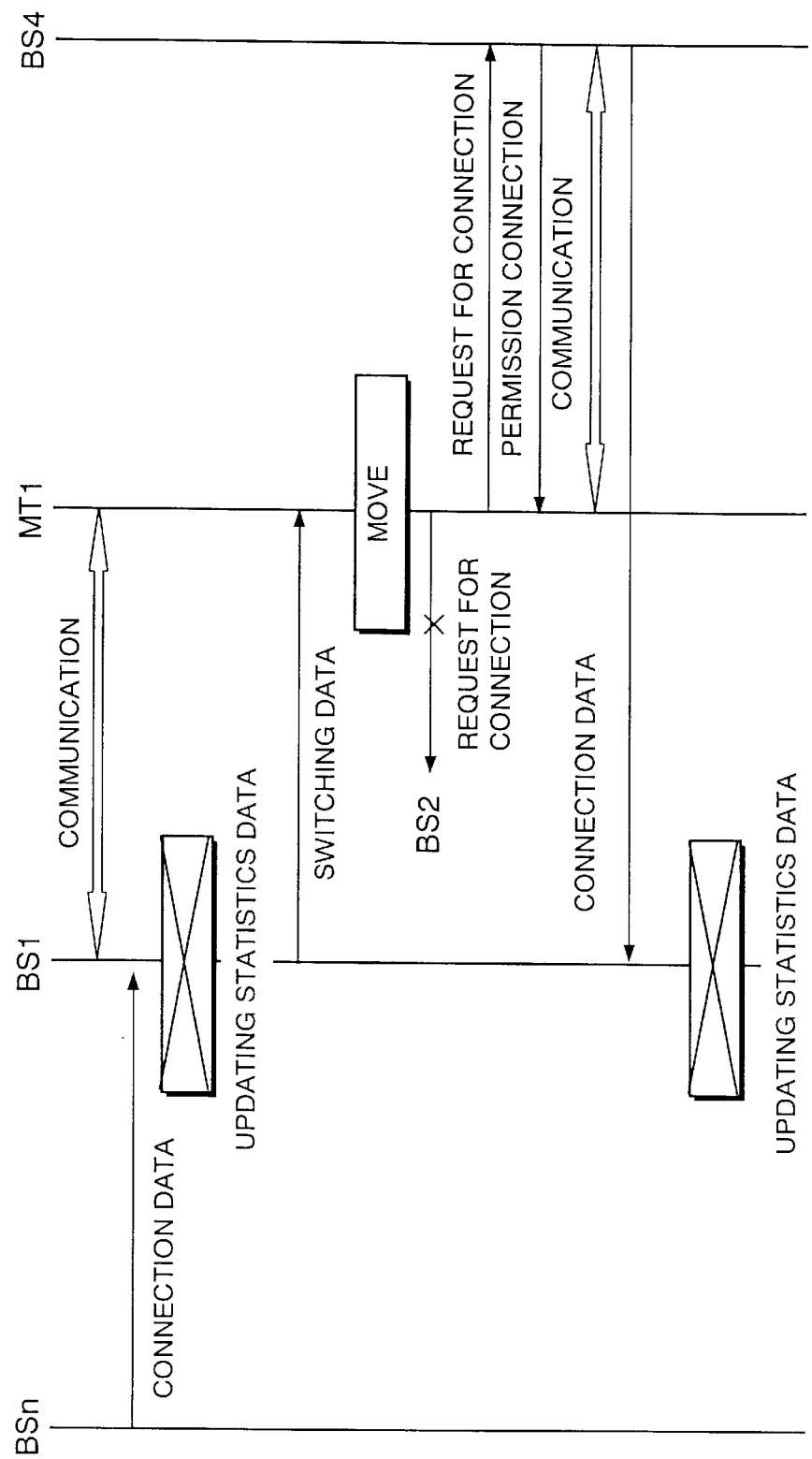
FIG. 4 is a diagram to illustrate how selection operation is performed between a terminal and base stations both representing embodiments of this invention.

FIG. 4 is a diagram to illustrate how selection operation is achieved between a terminal and base stations both representing embodiments of this invention. BS1, while communicating with MT1 under its coverage, continuously receives the latest connection data from the other base stations, and updates the intrinsic statistics data based on those data. Each time it updates the statistics data, it sends terminal MT1 switching data relevant to MT1 including switching priority.

Next, if MT1 moves into the control zone of another base station (BS4), MT1 selects the base station (e.g., BS2 in this case) having the highest priority based on the switching data previously sent by base station BS1, and transmits a request for connection using the frequency of the base station thus selected.

As it is, MT1 moves into the control zone of BS4, and thus it will not receive a response to its request for connection.

If MT1 finds it receives no response within a specified period of time, it transmits another request for connection by using the frequency of BS4. If MT1 receives an affirmative response from BS4, communication of MT1 with BS4 is established, and BS4 sends back the previously connected base station BS1 the information notifying that "MT1 has switched communication from BS1 with fno=1 to BS4 with fno=4 as a result of request for new connection." Thus, BS1 updates the statistics data it stores.

Other Embodiments of the Invention

A second embodiment of the invention is configured in the same manner as in the first embodiment, but rather serves as a scheme for arranging base stations on the basis of the statistics data as obtained in the first embodiment.

Take an example for illustration. The statistics data may be used to determine whether base stations are appropriately arranged by checking how often mobile stations under the coverage of different base stations come close to each other using the same frequency, because at that time the statistics data will allow the user to accurately grasp how the mobile stations pass through the boundary areas around that target base station. If radio waves having the same frequency band are used for voice communication by two terminals adjacent to each other, those waves will interfere with each other, and degrade the quality of radio waves received by those terminals. If facilities sustaining a LAN implemented in a premise are suddenly moved because of the limited size of floor, they are often reset inadvertently without due attention being paid to the distribution of frequencies to newly arranged base stations which may cause interference between base stations placed close to each other. In avoiding such inconvenience, the statistics data regarding the movement of terminals of this invention will serve as useful information for preventing interference between adjacent base stations, that is, the proper arrangement of base stations and distribution of frequencies to them are achieved based on the information. The system, by referring to the statistics data stored in base stations, can avoid the communication zone of a base station with a frequency which is likely to cause interference, and replace it with appropriate one, thereby preventing interference from the base station.

Further, it is possible for a base station to gather data regarding the terminals leaving or entering its communication zone, the stay time of those terminals, or other attributes, and to apply statistics operation to those data to use the result as an additional requirement for the determination of selection priority, thereby improving reliability in predicting the movement of those terminals.

Next, a still further embodiment of this invention will be described. According to this embodiment, the information managed by a base station further includes, for a mobile station under its coverage, the information regarding the base station with which the mobile station is most likely connected at the next moment, such as data necessary for achievement of communication based on a high-layered protocol, thereby enabling smooth switching of the mobile station from the currently connected base station to the newly connected station. Such extra information may include agent information such as mobile IP. This IP will be outlined below. Mobile IP is a protocol standardized by IETF (Internet Engineering Task Force), to allow a host terminal with an IP address to use external networks it temporarily passes through, and to continue communication without interruption even if the terminal moves from one external network to another.

The mobile IP allows, even when a mobile terminal host moves from a network to another, the host to continue communication in the same manner as in the previous network. In this embodiment, a home agent to manage communication through IP packets at the home network to which the mobile terminal belongs, and an external agent to manage communication at an external network into which the mobile terminal temporarily enters are defined; the IP address of the terminal is referred and confirmed both by the home and external agents; and then the terminal can communicate via the external network as well as via the home network.

Figure 5:
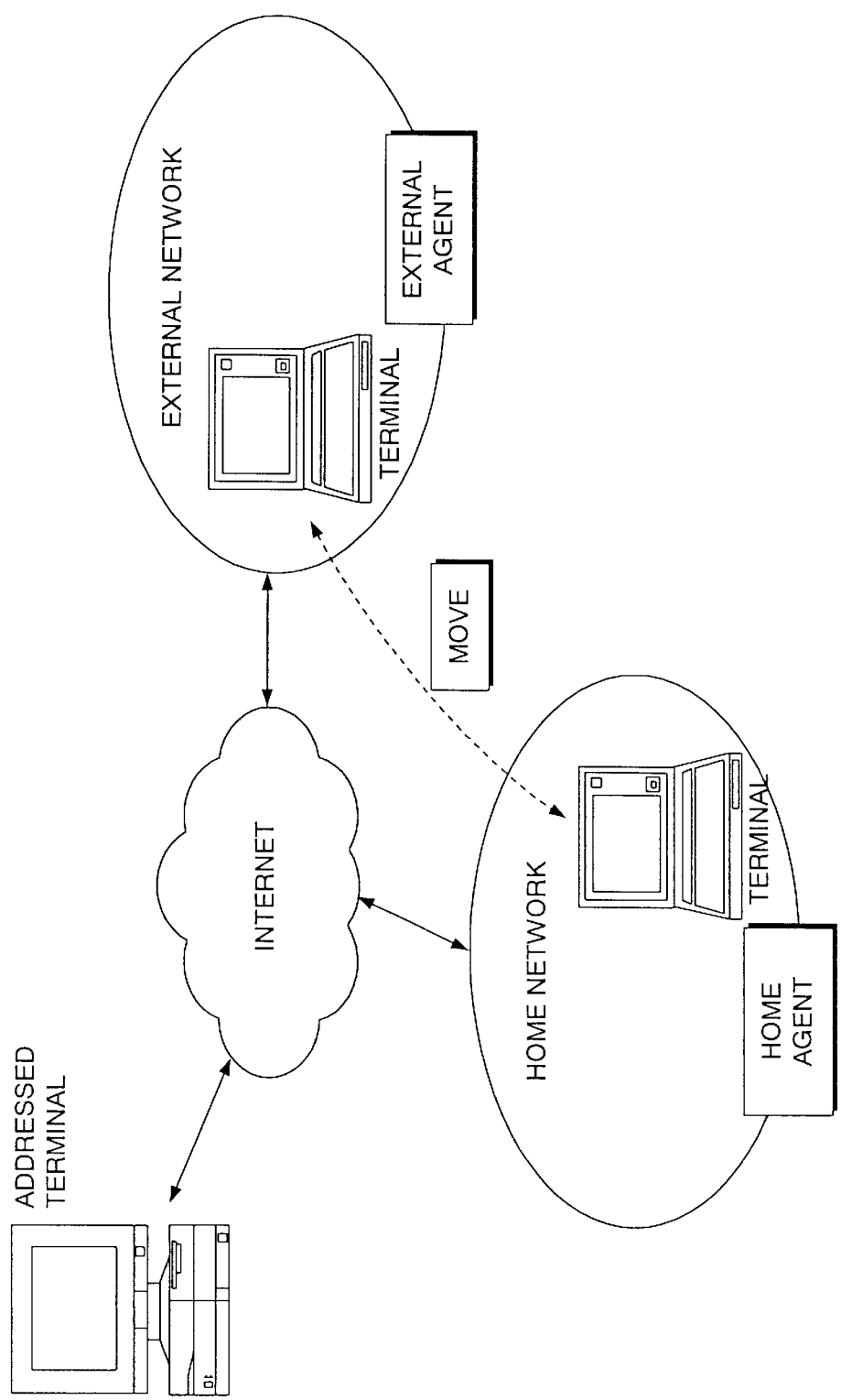
FIG. 5 is a diagram to illustrate the composition of another embodiment of this invention.

FIG. 5 illustrates how communication is maintained even if a terminal host moves from a network to another both having an agent function, or a still further embodiment of this invention.

With a still further embodiment of this invention, the information managed by each base station may include, in addition to the data of use frequencies and selection priority, the presence of said agent at the base station to be most likely connected at the next moment. This will allow the mobile terminal to prepare necessary operations for connection and to smoothly complete post-connection operations. To put it more concretely, a terminal smoothly starts operations necessary for connecting with the external agent of a network into which it enters, depending on the information regarding that base station previously given to the terminal. Therefore, it is possible for the user to communicate on IP in a network the user newly enters as well as in his home network, without resorting to any special operations for that purpose.

According to this invention, when a terminal machine moves from the coverage area of a base station apparatus (A) into the coverage area of another base station apparatus (B), base station apparatus (B) containing the terminal machine within its coverage area informs the previously connected base station apparatus (A) of the entry of the terminal into its coverage area. The previously connected base station apparatus (A) obtains statistics data from the information, and sends the terminal machines within its coverage area data regarding the base station apparatuses they are most likely to choose on leaving its coverage area. From the statistics data, the terminal can know what base station apparatuses it will be most likely connected at the next moment, and thus it will be possible for the terminal to instantly connect with such a predicted base station apparatus, as soon as it enters the coverage area of the latter.

Further, according to this invention, it is possible, even when two or more terminals move from different base stations using the same frequency, for the base station approached to determine that the terminals in question come from the base stations whose coverage areas are close to each other, and thus to alter the frequencies of base stations they are most likely connected next, thereby avoiding interference between the terminals.

Furthermore, according to this invention, the information regarding the base stations to be most likely connected at the next moment may further include the presence of an agent at the imminent base station, and thus it is possible for a terminal to prepare operations necessary for switching of agents before it enters the coverage area of the network with that agent, and thus to smoothly complete post-connection operations.

What is claimed is:

1. A base station selection system for a wireless local area network (LAN), useful for a communication system based on a wireless LAN comprising a plurality of wireless base stations, one or more wireless mobile terminal machines to practice communication using specific frequency bands, and a cabled LAN connecting the wireless base stations, wherein:

the wireless base station comprises a statistics part to summate statistics data such as connection data of individual wireless mobile terminal machines which leave the communication zone of that base station to enter the communication zones of other wireless base stations, and a means to obtain, from the connection data of each of the above terminal machines, base station data arranging base stations to be likely connected at the next moment in the order of likeliness of their being connected, and to provide the terminal machine with the base station data thus obtained;

the wireless mobile terminal machine comprises a frequency selection part whereby it is possible for the terminal, when it enters into the communication zone of another wireless base station, to refer to the base station data arranging base stations in the order of likeliness of their being connected, and select an appropriate frequency for voice communication according to the base station to be most likely connected at the next moment.

2. A base station selection system for a wireless LAN as described in claim 1 wherein:

the wireless base station comprises a receiving part to obtain connection data of a terminal machine which has entered its communication zone, and been given communication permission, and a transmitting part to transmit the connection data thus obtained to the base station previously connected with that terminal machine through the cabled LAN.

3. A base station selection system for a wireless LAN as described in claim 2 wherein:

the base station apparatus comprises a data managing part to update the statistics data regarding the connection of terminals under its coverage based on the connection data sent successively by the previously connected base stations, and to obtain therefrom, for those individual terminals, the likeliness of their being connected with other base stations after they leave the present base station, the connection data including data combining the identification numbers of the other base stations likely to be connected and their frequencies, as well as the identification number of the present base station and its frequency.

4. A base station selection system for a wireless LAN as described in claim 3 wherein:

the wireless base station comprises a use frequency switching circuit to set a frequency to be used in its communication zone, a base station switching data receiving circuit to receive base station switching data from terminals, a base station switching data transmitting circuit to transmit the switching data to mobile terminals within its communication zone, a selection priority transmitting circuit, a base station switching data receiving circuit to receive the base station switching data from other base stations via the cabled LAN connecting the wireless base stations, a terminal/base station data managing portion, a radio communication circuit to communicate data with terminal machines, and a via-network communication circuit to communicate data via the cabled LAN.

5. A base station selection system for a wireless LAN as described in claim 3 wherein:

the wireless terminal machine further comprises a use frequency switching circuit to choose a frequency to be used for communication with a base station, a base station data receiving circuit to receive base station data from the base station whose communication zone it is in, a selection priority receiving circuit, a base station switching data managing portion, a base station switching data transmitting portion, and radio communication circuit to communicate data with a base station.

6. A base station selection system for a wireless LAN as described in claim 3 wherein:

the statistics data updated by the wireless base station apparatus includes, in addition to the statistics data of the terminal machines leaving the communication zone of the base station in question, and of the terminal machines newly entering the same communication zone, the passage time of those terminals and data regarding other attributes of that base station.

7. A base station selection system for a wireless LAN as described in claim 3, wherein:

the statistics data updated by the wireless base station apparatus further comprises the information regarding a communication agent to support a high ordered communication protocol installed in the wireless base station to be most likely connected at the next moment.

8. A base station selection system for a wireless LAN as described in claim 1 wherein:

the wireless base station apparatus further comprises an identifying part to identify the use frequencies of adjacent base stations by referring to the statistics data updated based on the connection data provided by other wireless base stations, and a frequency adjusting part to choose a frequency based on the knowledge thus obtained to avoid thereby interference from adjacent base stations.

9. A base station selection method for a wireless local area network (LAN), useful for a communication system based on a wireless LAN comprising a plurality of wireless base stations, one or more wireless mobile terminal machines to practice communication using specific frequency bands, and a cabled LAN connecting the wireless base stations comprising the steps of:

summating statistics data such as connection data of individual wireless mobile terminal machines which leave the communication zone of that base station to enter the communication zones of other wireless base stations;

obtaining from the connection data of each of the above terminal machines, base station data arranging base stations to be likely connected at the next moment in the order of likeliness of their being connected; and providing the terminal machine with the base station data thus obtained.

10. A base station selection method for a wireless local area network (LAN) as described in claim 9, further comprising the steps of;

frequency selecting whereby it is possible for the terminal, when it enters into the communication zone of another wireless base station;

referring to the base station data arranging base stations in the order of likeliness of their being connected; and selecting an appropriate frequency for voice communication according to the base station to be most likely connected at the next moment.

11. A base station selection method for a wireless LAN as described in claim 10 also comprising:

obtaining connection data of a terminal machine which has entered its communication zone, and been given communication permission; and transmitting the connection data thus obtained to the base station previously connected with that terminal machine through the cabled LAN.

12. A base station selection method for a wireless LAN as described in claim 11 further comprising the steps of:

updating the statistics data regarding the connection of terminals under its coverage based on the connection data sent successively by the previously connected base stations;

obtaining therefrom, for those individual terminals, the likeliness of their being connected with other base stations after they leave the present base station, wherein the connection data including data combining the identification numbers of the other base stations likely to be connected and their frequencies, as well as the identification number of the present base station and its frequency.

13. A base station selection method for a wireless LAN as described in claim 12 also comprising the steps of:

setting a frequency to be used in its communication zone;

receiving base station switching data from terminals;

transmitting the switching data to mobile terminals within its communication zone;

selection priority transmitting;

base station switching data receiving to receive the base station switching data from other base stations via the cabled LAN connecting the wireless base stations;

terminal/base station data managing;

radio communicating to communicate data with terminal machines; and communicating data via the cabled LAN.

14. A base station selection method for a wireless LAN as described in claim 13 also comprising the step of:

frequency switching to choose a frequency to be used for communication with a base station;

base station data receiving to receive base station data from the base station whose communication zone it is in;

selection priority receiving base station switching data managing;

base station switching data transmitting; and radio communicating to communicate data with a base station.

15. A base station selection method for a wireless LAN as described in claims 14 also comprising the steps of:

identifying the use frequencies of adjacent base stations by referring to the statistics data updated based on the connection data provided by other wireless base stations; and frequency adjusting to choose a frequency based on the knowledge thus obtained to avoid thereby interference from adjacent base stations.

* * * * *